United States Patent
Ueda et al.

(10) Patent No.: US 6,215,591 B1
(45) Date of Patent: Apr. 10, 2001

(54) LENS MANUFACTURING METHOD THEREOF, AND OPTICAL PICKUP

(75) Inventors: Hiroyuki Ueda, Kanagawa; Shinji Saito, Tokyo; Satoshi Kawakita, Tokyo; Hiroyuki Sakakibara, Tokyo, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/352,753

(22) Filed: Jul. 14, 1999

(30) Foreign Application Priority Data

Jul. 17, 1998 (JP) .................................................. 10-203829

(51) Int. Cl.⁷ ...................................................... G02B 5/18
(52) U.S. Cl. .......................... 359/571; 359/566; 359/570; 369/109
(58) Field of Search ...................................... 359/565, 566, 359/571, 570, 19; 369/103, 109, 44.11, 44.42

(56) References Cited

U.S. PATENT DOCUMENTS 5,299,062 * 3/1994 Ogata ................................. 359/571
5,841,754 * 11/1998 Lee et al. ............................. 369/109
5,978,140 * 11/1999 Maruyama ........................... 359/569

FOREIGN PATENT DOCUMENTS 62-288030   12/1987   (JP) .

* cited by examiner

Primary Examiner—Darren Schuberg
Assistant Examiner—Fayez Assaf
(74) Attorney, Agent, or Firm—Sonnenschein, Nath & Rosenthal

(57) ABSTRACT

Disclosed are a lens efficiently manufactured into an accurate shape at a low cost, a manufacturing method thereof, and an optical pickup using the lens. The lens includes a geometrical optics portion for converging light having been incident thereon from its light incoming plane, and two diffraction optics portions provided on the light incoming plane and a light outgoing plane of the geometrical optics portion, wherein the diffraction optics portions are made from a material different from that of the geometrical optics portion.

16 Claims, 6 Drawing Sheets

LENS MANUFACTURING METHOD THEREOF, AND OPTICAL PICKUP

RELATED APPLICATION DATA

The present application claims priority to Japanese Application No. P10-203829 filed Jul. 17, 1998, which application is incorporated herein by reference to the extent permitted by law.

BACKGOUND OF THE INVENTION

The present invention relates to a lens, a manufacturing method thereof, and an improved optical pickup, and particularly to a lens capable of being accurately and efficiently manufactured, a manufacturing method thereof, and an optical pickup using the lens.

At present, the recording density of an optical disk has been increased as exemplified by a DVD (Digital Video Disk), and to realize the high density of an optical disk, it has been required to shorten the wavelength of a laser beam and to make a beam spot size small. In order to make a beam spot size small, it is necessary to increase the numerical aperture (hereinafter, referred to as "NA") of a lens. The numerical aperture of a lens can be increased by making the diameter of the lens large, however, the size of the lens is restricted if the lens is assembled into a small-sized mechanical deck such as an optical pickup. In particular, it is difficult to manufacture a lens which is small in diameter having large radius of curvature. For this reason, to obtain a lens having a high NA, there has been used a so-called hologram integrally formed lens in which diffraction optics portions configured as blazed holograms are formed on a light incoming plane and a light outgoing plane of a geometrical optics portion configured as an aspherical lens. In addition, the hologram integrally formed lens is also used as an objective lens adapted to obtain two focal points for one lens.

Figure 1A:
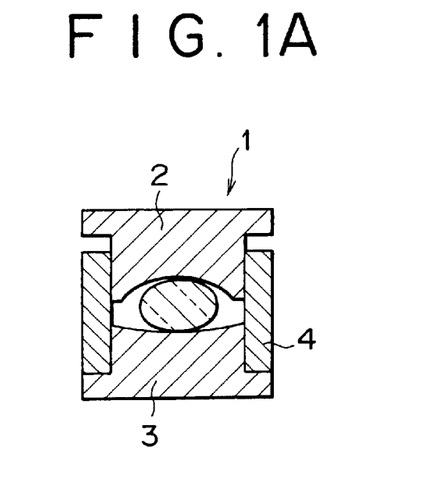
FIGS. 1A and 1B are configuration views showing one example of a manufacturing apparatus of a hologram integrally formed lens in a related art.
Figure 1B:
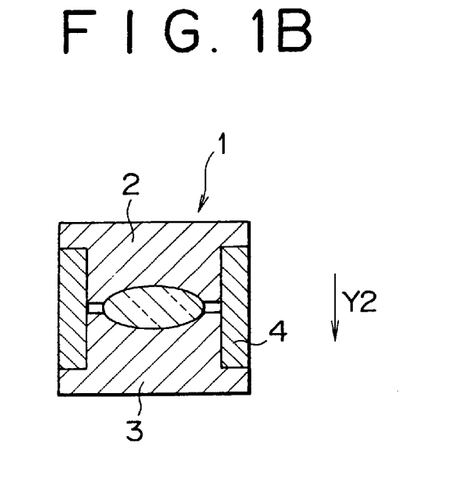

A prior art lens manufacturing apparatus for manufacturing a hologram integrally formed lens is shown in FIGS. 1A and 1B. A lens manufacturing apparatus 1 shown in FIG. 1A includes an upper die 2, a lower die 3, and a core die 4. A hollow portion having a shape equivalent to that of a lens is formed between the upper die 2 and the lower die 3, and glass as a material for forming the lens is supplied to the hollow portion. The upper die 2 is movable in the direction shown by an arrow Y2 along the core die 4, to apply a pressure to glass. A hologram integrally formed lens is manufactured by executing the steps of; supplying glass into the hollow portion as shown in FIG. 1A, heating the upper die 2 and the lower die 3 to a glass formable temperature, moving the upper die 2 in the direction Y2 to press-form the glass, thereby transferring the shape of the die onto the glass. After cooling glass down, a hologram integrally formed lens is obtained.

Figure 2A:
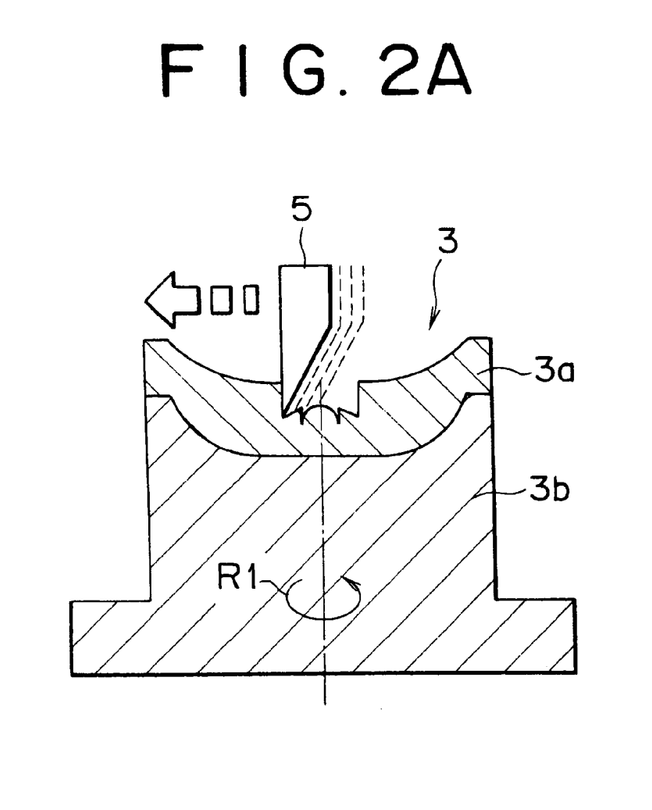
FIGS. 2A and 2B are configuration views showing a state in which a die shown in FIGS. 1A and 1B is shaped by machining.
Figure 2B:
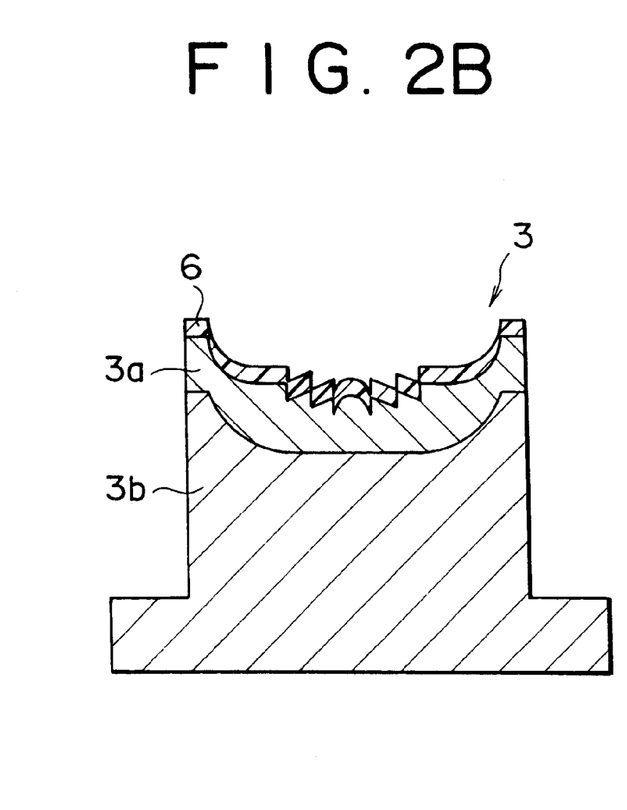

Here, each of the upper and lower dies 2 and 3 must be accurately formed into a shape equivalent to that of a lens to be formed. FIGS. 2A and 2B show a state in which the die is shaped by machining. In addition, since the process of shaping the upper die 2 is the same as the process of shaping the lower die 3, only the latter process will be described with reference to FIGS. 2A and 2B, omitting the description of the upper die 2. Referring to FIG. 2A, the lower die 3 is composed of a base member 3b and a layer 3a to be machined. The layer 3a is formed of, for example, a film made from a noble metal such as platinum (Pt) or iridium (Ir). The reason for this is that since the melting point of glass is high, the layer 3a is required to be made from such a material which is not to be fusion-bonded to glass upon formation of the lens. The layer 3a is machined into a shape equivalent to that of a diffraction optics portion of a lens using a bite 5 made from diamond or the like. Then, as shown in FIG. 2B, after formation of the layer 3a into a specific shape, a protective layer 6 is formed on the surface of the layer 3a for preventing the diffraction optics portion from losing its shape.

The above method of machining the layer formed of the film made from a noble metal poor in machinability such as platinum (Pt) or iridium (Ir), however, has a problem in occurrence of heavy wear of the bite. To solve such a problem, it may be considered to replace the material of the layer to be machined, from a noble metal to a material exhibiting good machinability, for example, electroless-plated nickel, however, in this case, the electroless nickel plating has another problem that since the melting point of glass is high, the electroless-plated nickel layer on the surface of the die may be fusion-bonded to glass or severely consumed upon formation of the lens.

SUMMARY OF THE INVENTION

An object of the present invention is to provide a lens having a high numerical aperture which is capable of being accurately, efficiently manufactured at a low cost, a manufacturing method thereof, and an optical pickup using the lens.

To achieve the above object, according to a first aspect of the present invention, there is provided a lens including; a geometrical optics portion for converging light having been incident thereon from its light incoming plane, and two diffraction optics portions provided on the light incoming plane and a light outgoing plane of the geometrical optics portion, wherein the diffraction optics portions are made from a material different from that of the geometrical optics portion and joined each other. With this configuration, the diffraction optics portions, which are made from the material different from that of the geometrical optics portion, for example, a resin, are joined to the light incoming plane and the light outgoing plane of the geometrical optics portion, and accordingly it is possible to easily form the diffraction optics portions.

To achieve the above object, according to a second aspect of the present invention, there is provided a method of manufacturing a lens including a geometrical optics portion and two diffraction optics portions, including the steps of; inserting a material for forming the geometrical optics portion in a first die having a shape equivalent to that of the geometrical optics portion, press-forming the material by applying a pressure to the first die to form the geometrical optics portion, pouring a material for forming the diffraction optics portions in a second die having shapes equivalent to those of the diffraction optics portions, and inserting the geometrical optics portion having been formed by press-forming in the second die to join the geometrical optics portion to the diffraction optics portions. With this configuration, since a material for forming the diffraction optics portions, for example, a resin is joined to the light incoming plane and the light outgoing plane of the previously formed geometrical optics portion to form the diffraction optics portions, and accordingly, it is possible to easily form the diffraction optics portions on the geometrical optics portion.

To achieve the above object, according to a third aspect of the present invention, there is provided an optical pickup including; a light source for outputting a laser beam, a light splitting means for splitting the laser beam emitted from the light source into pieces, an objective lens for converging the laser beam from the light splitting means on a signal recording plane of an optical recording medium, and an optical detector for detecting a return laser beam reflected from the signal recording plane, wherein the objective lens includes a geometrical optics portion and two diffraction optics portions formed on the geometrical optics portion, the diffraction optics portions being made from a material different from that of the geometrical optical portion. With this configuration, the objective lens is configured such that the diffraction optics portions, which are made from the material different from that of the geometrical optics portion, are joined to the light incoming plane and the light outgoing plane of the geometrical optics portion, and accordingly it is possible to easily form the diffraction optics portions on the geometrical optics portion, and hence to provide a high performance optical pickup at a low cost by using a lens which has a high numerical aperture and a small spherical aberration and which can be efficiently manufactured at a low cost.

DETAILED DESCRIPTION OF THE PREFERRED EMBODIMENTS

Hereinafter, preferred embodiments of the present invention will be described in detail with reference to the accompanying drawings.

Figure 3:
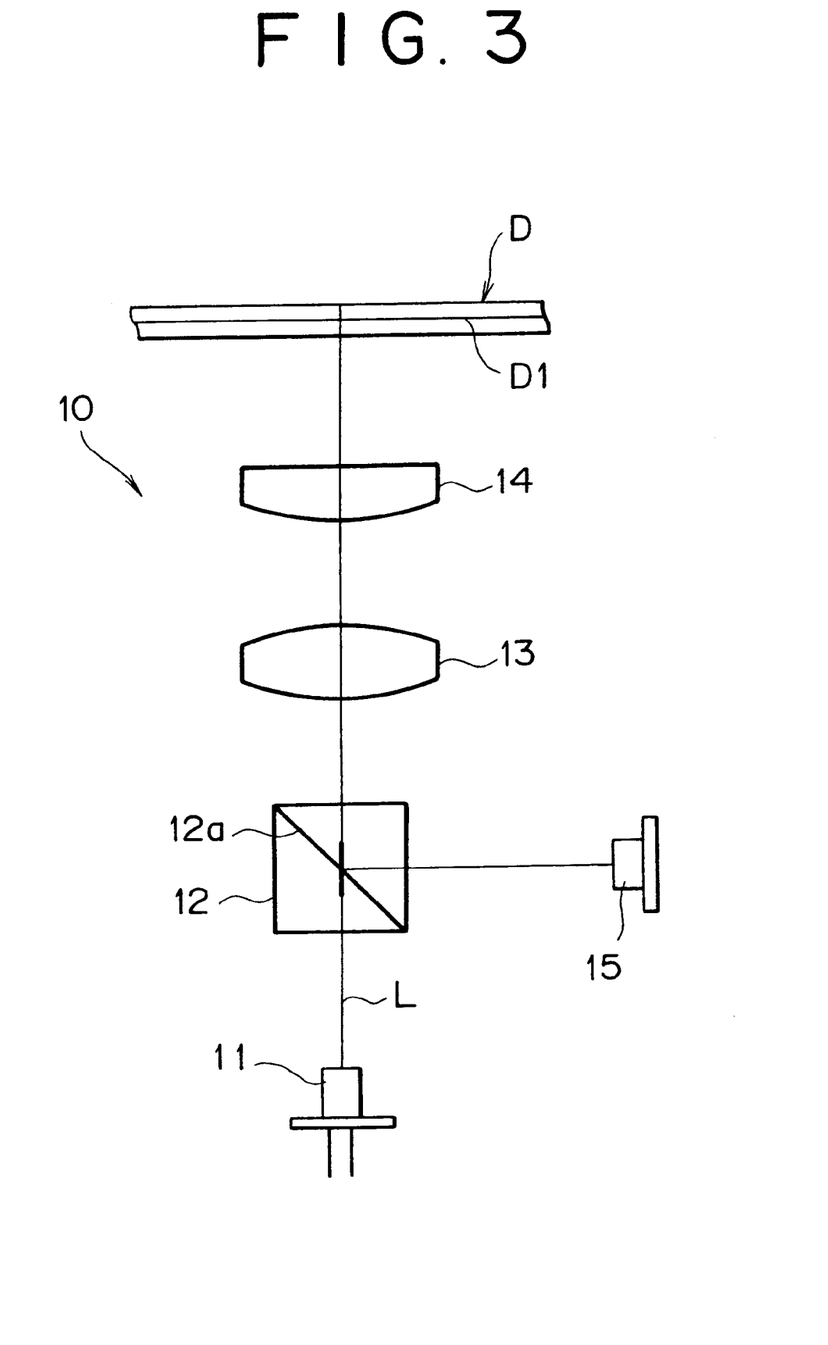
FIG. 3 is a system diagram showing a preferred embodiment of an optical pickup of the present invention.

FIG. 3 is a configuration diagram showing a preferred embodiment of an optical pickup of the present invention. Now, an optical pickup 10 will be described in detail with reference to FIG. 3.

The optical pickup 10 shown in FIG. 3 includes a light source 11, a beam splitter 12 as a light splitting means, a collimator lens 13, an objective lens 14, and an optical detector 15.

The light source 11 is adapted to emit a laser beam having a wavelength $\lambda$ of 650 nm for recording and/or reproducing information on and/or from an optical disk D and is configured as a semiconductor laser element. A laser beam emitted from the light source 11 is incident on the beam splitter 12. The beam splitter 12 has a beam splitter film 12a tilted approximately 45° with respect to the optical axis. The laser beam having been incident on the beam splitter 12 is emerged from the beam splitter 12 and is incident on the collimator lens 13.

The laser beam having been incident on the collimator lens 13 is collimated and is made incident on the objective lens 14. The laser beam is then converged on a signal recording plane D1 of the optical disk D through the objective lens 14. A return laser beam reflected from the signal recording plane of the optical disk D is made sequentially incident on the objective lens 14, collimator lens 13, and beam splitter 12, and is reflected from the beam splitter film 12a to enter the optical detector 15. The optical detector 15 is adapted to convert the return laser beam into an electric signal and output a readout signal or the like.

Figure 4:
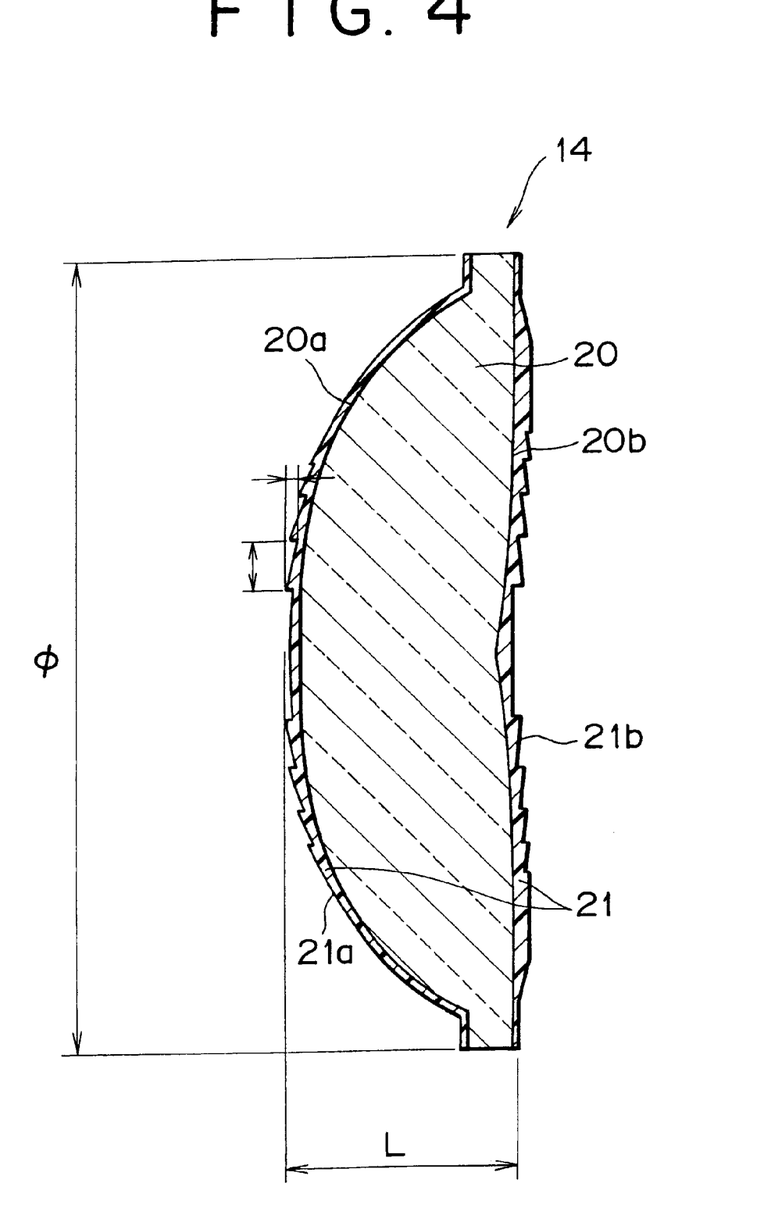
FIG. 4 is a sectional view showing a preferred embodiment of a lens of the present invention.

FIG. 4 is a sectional view showing a preferred embodiment of the objective lens 14 of the present invention. The objective lens 14 shown in FIG. 4 is composed of a geometrical optics portion 20 and a diffraction optics portion 21. The geometrical optics portion 20 is formed of an aspherical lens made from, for example, glass. To be more specific, the geometrical optics portion 20 is of a convex lens for converging a laser beam having been incident thereon from a light incoming plane 20a. A light incoming plane side diffraction optics portion 21a and a light outgoing plane side diffraction optics portion 21b are formed on the light incoming plane 20a and the light outgoing plane 20b of the geometrical optics portion 20, respectively. The diffraction optics portion 21 composed of the light incoming plane side diffraction optics portion 21a and the light outgoing plane side diffraction optics portion 21b is made from, for example, a CR39 (thermosetting resin) or a photo-setting resin such as an ultraviolet curing resin. The diffraction optics portion 21 is formed into a blazed shape or serrated shape.

The laser beam having been incident on the objective lens 14 from the light incoming plane 20a is nearly all diffracted and converged by the light incoming plane side diffraction optics portion 21a to be made incident on the geometrical optics portion 20. The geometrical optics portion 20 converges the incident laser beam by the function of the convex lens, and makes the laser beam incident on the light outgoing plane side diffraction optics portion 21b. The light outgoing plane side diffraction optics portion 21b diffracts nearly all of the quantity of the incident laser beam, to thereby further converge the laser beam. Accordingly, the objective lens 14 attains a high numeral aperture NA. For example, the objective lens 14 shown in FIG. 4, which has a width L of 3.035 mm and a diameter $\phi$ of 5.76 mm, attains the numerical aperture NA of 0.85.

In this embodiment, to diffract nearly all the quantity of the incident laser beam, the diffraction optics portion 21 is configured to have a depth ranging from 600 nm to 700 nm and a pitch ranging from 0.020 mm to 0.340 mm, wherein the depth and the pitch are changed in the radial direction in such a manner that the pitch becomes smaller and the depth becomes narrower in the direction from the center to the outer periphery of the objective lens 14.

FIGS. 5A to 5C and FIGS. 6A to 6E are configuration views showing a state of manufacturing the objective lens 14. A process of manufacturing the objective lens 14, called a replica process, will be described in detail with reference to FIGS. 5A to 5C and FIGS. 6A to 6E. The process of manufacturing the objective lens 14 is generally divided into a process of manufacturing the geometrical optics portion 20 and a process of manufacturing the diffraction optics portion 21. First, the process of manufacturing the geometrical optics portion 20 will be described with reference to FIGS. 5A to 5C.

Figure 5A:
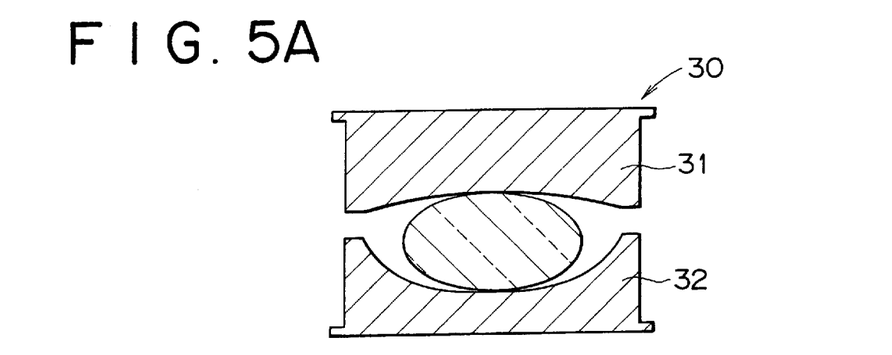
FIGS. 5A to 5C are configuration views showing a state in which a geometrical optics portion of the lens shown in FIG. 4 is manufactured.

FIG. 5A shows a die 30 composed of an upper die 31 and a lower die 32 between which a space having a shape being substantially the same as that of the geometrical optics portion 20 is formed for inserting glass therein. First, glass is inserted in the space between the upper and lower dies 31 and 32.

Figure 5B:
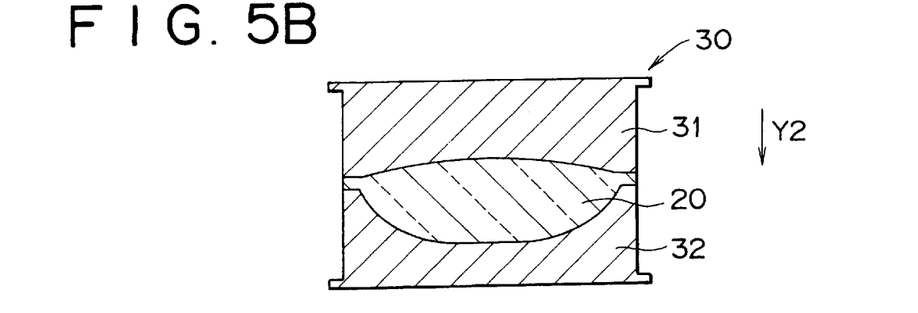

In this case, a predetermined amount of glass is inserted to be formed into a spherical shape. Then, to avoid fusion-bonding between the die 30 and the glass, an inert gas is injected in the die 30, and the glass is heated up to a glass formable temperature. After the glass is heated until it exhibits a specific viscosity, the upper die 31 is moved, for example, in the direction shown by an arrow Y2 as shown in FIG. 5B to press-form the glass by applying a pressure thereto. The glass is gradually cooled and then rapidly cooled, to obtain the geometrical optics portion 20 shown in FIG. 5C.

Figure 6A:
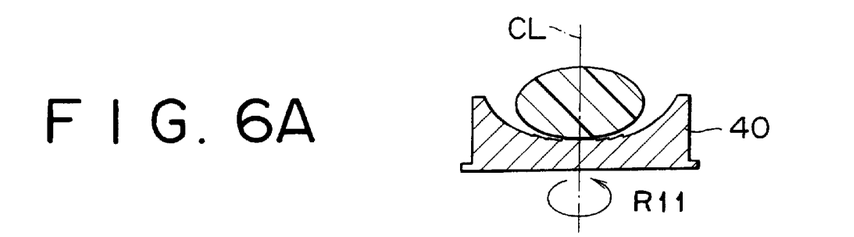
FIGS. 6A to 6E are configuration views showing a state in which a diffraction optics portion of the lens shown in FIG. 4 is manufactured.

Next, the process of manufacturing the diffraction optics portion 21 will be described with reference to FIGS. 6A to 6E. In addition, although only the process of forming the diffraction optics portion 21 on the light incoming plane 20a of the geometrical optics portion 20 shown in FIG. 4 will be described with reference to FIGS. 6A to 6E, the diffraction optics portion 21 is also actually formed on the light outgoing plane 20b by an upper die (not shown). First, as shown in FIG. 6A, there is prepared a lower die 40 having a surface formed into a shape equivalent to that of the diffraction optics portion 21. The lower die 40 is formed of a main body made from a stainless steel based material or a sintered hard alloy such as tungsten carbide, wherein electroless nickel plating is applied to the main body. The electroless nickel plating layer of the lower die 40 is machined by single point turning using a bite made from diamond, to form a shape equivalent to that of the diffraction optics portion 21. By provision of the electroless nickel plating layer on the surface of the lower die 40, the machinability of the lower die 40 is improved, to thereby easily form the shape equivalent to that of the diffraction optics portion 21 on the surface of the lower die 40. In this case, since the diffraction optics portion 21 is made from a resin formable at a temperature relatively lower than the glass formable temperature, there is no fear of fusion-bonding of the electroless nickel plating layer formed on the lower die 40 upon formation of the diffraction optics portion 21 by the electroless nickel plating layer formed on the lower die 40.

Figure 6B:
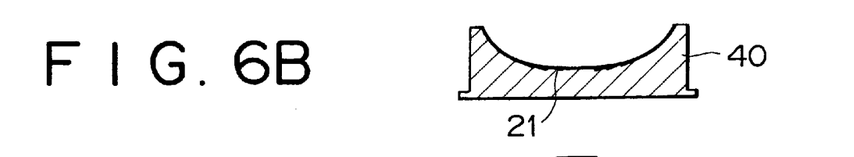

A resin for forming the diffraction optics portion 21 is supplied to the lower die 40. Then, the resin is subjected to vacuum-defoaming, and the lower die 40 is rotated at a high speed in the direction shown by an arrow R11 around an axis CL of the lower die 40. Thus, as shown in FIG. 6B, there remains the resin in an amount necessary for the diffraction optics portion 21 to be formed on the lower die 40.

Figure 5C:
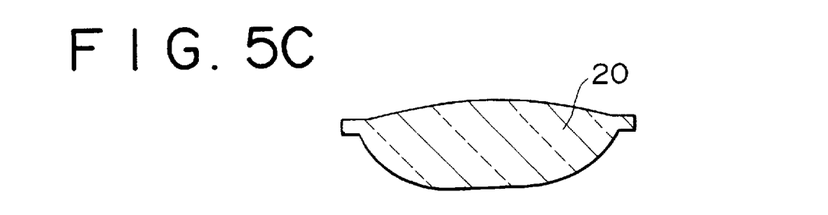
Figure 6C:
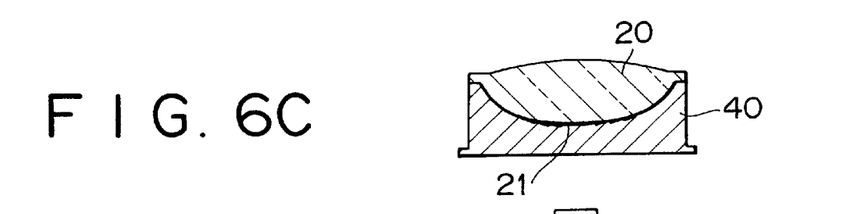
Figure 6D:
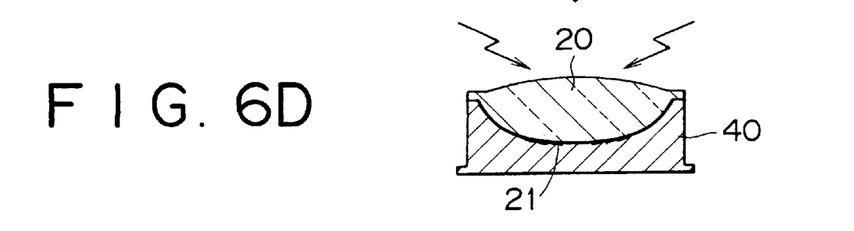
Figure 6E:
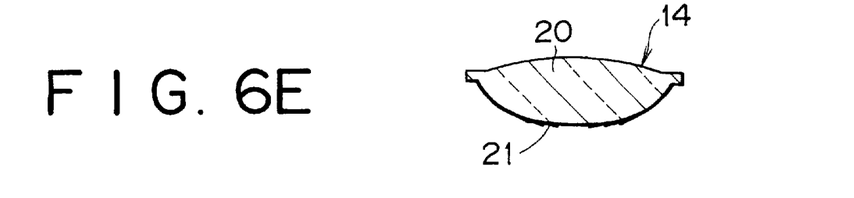

Then, as shown in FIG. 6C, the geometrical optics portion 20 manufactured in the process shown in FIGS. 5A to 5C is mounted on the resin coated on the lower die 40, whereby the diffraction optics portion 21a is joined to the light incoming plane 20a of the geometrical optics portion 20. Next, as shown in FIG. 6D, in the case of using the ultraviolet curing resin, the resin is irradiated with ultraviolet rays, and in the case of using the thermosetting resin, the resin is cured by heating the die. In this way, as shown in FIG. 6E, the diffraction optics portion 21 is formed on the light incoming plane 20a of the geometrical optics portion 20.

According to the above-described embodiment, the lens 14 having a high numerical aperture and a good transmission wave front aberration can be manufactured. Also, in manufacturing the lens 14 having the geometrical optics portion 20 and the diffraction optics portion 21, since the geometrical optics portion 20 and the diffraction optics portion 21 are separately formed, it is possible to accurately obtain the shape of the diffraction optics portion 21 by transfer from the die 40 and also to manufacture the lens 14 at a low cost. Further, since the die 40 for forming the diffraction optics portion 21 can be easily machined, the lens 14 can be efficiently manufactured. In addition, the total cost of the optical pickup 10 can be reduced by using the lens 14 efficiently manufactured at a low cost as the objective lens.

The present invention is not limited to the above embodiment. While the objective lens 14 is manufactured in accordance with the so-called replica process shown in FIGS. 5A to 5C and FIGS. 6A to 6E, it may be manufactured by a so-called insert molding process of inserting the geometrical optics portion 20 made from glass in an injection mold for molding the diffraction optics portion 21, and injecting molding a resin around the geometrical optics portion 20. Although the lens 14 shown in FIGS. 5A to 5C and FIGS. 6A to 6E is configured as the objective lens 14 having a high numerical aperture, it may be configured as a bifocal lens in which the geometrical optics portion 20 is combined with the diffraction optics portion 21.

Further, in the above embodiment, the lens of the present invention is used as the objective lens 14 of the optical pickup 10 shown in FIG. 3, it can be applied to a lens for converging light, for example, an image pickup lens. In addition, the objective lens 14 shown in FIG. 4 is manufactured in accordance with the two processes, however, the two process can be carried out using the same apparatus only by changing the die.

While the preferred embodiments of the present invention have been described using the specific terms, such description is for illustrative purposes only, and it is to be understood that changes and variations may be made without departing from the spirit or scope of the following claims.

What is claimed is:

1. A lens, comprising:
   a geometrical optics portion having a light incoming plane, a light outgoing plane, and an aspherical shape, said geometrical optics portion adapted to converge light incident on said light incoming plane, said geometrical optics portion comprising a first material;
   a first diffraction optics portion formed on the light incoming plane of said geometrical optics portion; and
   a second diffraction optics portion formed on the light outgoing plane of said geometrical optics portion;
   wherein said first and said second diffraction optics portions are made from a second material different from that of said first material of said geometrical optics portion.

2. The lens according to claim 1, wherein a melting point of the second material of said first and said second diffraction optics portions is lower than that of the first material of said geometrical optics portion.

3. The lens according to claim 1, wherein said first and said second diffraction optics portions are each formed into a blazed shape.

4. The lens according to claim 1, wherein said geometrical optics portion is made from glass.

5. The lens according to claim 1, wherein said first and said second diffraction optics portions are made from a resin.

6. The lens according to claim 1, wherein said first and said second diffraction optics portions each have a depth ranging from 600 nm to 700 nm and a pitch ranging from 0.020 mm to 0.34 mm.

7. The lens according to claim 6, wherein the depth and the pitch of each of said first and said second diffraction optics portions vary in the radial direction of said lens so that the pitch of each of said first and said second diffraction optics portions becomes smaller and the depth of each of said first and said second diffraction optics portion becomes narrower proceeding in a direction from a center of said lens to an outer periphery of said lens.

8. An optical pickup, comprising:

a light source adapted to emit a laser beam;

a light splitting means for splitting the laser beam emitted from said light source into a plurality of separate laser light rays;

an objective lens for converging the laser beam from said light splitting means on a signal recording plane of an optical recording medium; and an optical detector for detecting a return laser beam reflected from said signal recording plane;

wherein said objective lens comprises a geometrical optics portion having a light incoming plane, a light outgoing plane, and an aspherical shape, said geometrical optics portion comprising a first material, said objective lens further comprising a first diffraction optics portion formed on the light incoming plane of said geometrical optics portion and a second diffraction optics portion formed on the light outgoing plane of said geometrical optics portion, said first and said second diffraction optics portions being made from a second material different from that of said first material of said geometrical optical portion.

9. The optical pickup according to claim 8, wherein a melting point of the second material of said first and said second diffraction optics portions is lower than that of the first material of said geometrical optics portion.

10. The optical pickup according to claim 8, wherein said first and said second diffraction optics portions are each formed into a blazed shape.

11. The optical pickup according to claim 8, wherein said geometrical optics portion is made from glass.

12. The optical pickup according to claim 8, wherein said first and said second diffraction optics portions are made from a resin.

13. The lens according to claim 8, wherein said first and said second diffraction optics portion each have a depth ranging from 600 nm to 700 nm and a pitch ranging from 0.020 mm to 0.34 mm.

14. The lens according to claim 13, wherein the depth and the pitch of each of said first and said second diffraction optics portion vary in the radial direction of said lens so that the pitch of each of said first and said second diffraction optics portion becomes smaller and the depth of each of said first and said second diffraction optics portion becomes narrower proceeding in a direction from a center of said lens to an outer periphery of said lens.

15. The lens according to claim 8, wherein said light splitting means is a prism.

16. An optical pickup, comprising:

a light source adapted to emit a laser beam;

a splitter adapted to split the laser beam emitted from said light source into a plurality of separate laser light rays;

an objective lens for converging the laser beam from said light splitting means on a signal recording plane of an optical recording medium; and an optical detector for detecting a return laser beam reflected from said signal recording plane;

wherein said objective lens comprises a geometrical optics portion having a light incoming plane, a light outgoing plane, and an aspherical shape, said geometrical optics portion comprising a first material, said objective lens further comprising a first diffraction optics portion formed on the light incoming plane of said geometrical optics portion and a second diffraction optics portion formed on the light outgoing plane of said geometrical optics portion, said first and said second diffraction optics portions being made from a second material different from that of said first material of said geometrical optical portion.

* * * * *